(12) United States Patent
Vansickel et al.

(10) Patent No.: US 9,733,890 B2
(45) Date of Patent: Aug. 15, 2017

(54) STREAMING AUDIO, DSP, AND LIGHT CONTROLLER SYSTEM

(71) Applicant: Audio Accessories Group, LLC, Tempe, AZ (US)

(72) Inventors: Larry Vansickel, Phoenix, AZ (US); Wang Hai, Ningbo (CN); Wen Gong Gu, Ningbo (CN)

(*) Notice: Subject to any disclaimer, the term of this patent is extended or adjusted under 35 U.S.C. 154(b) by 0 days.

(21) Appl. No.: 14/944,876

(22) Filed: Nov. 18, 2015

(65) Prior Publication Data

US 2017/0039024 A1     Feb. 9, 2017

(30) Foreign Application Priority Data

Aug. 3, 2015 (CN) .......................... 2015 1 0464611

(51) Int. Cl.
| | |
|---|---|
| H04W 4/00 | (2009.01) |
| G06F 3/16 | (2006.01) |
| H04M 1/725 | (2006.01) |
| H05B 37/02 | (2006.01) |
| H05B 33/08 | (2006.01) |

(52) U.S. Cl.
CPC ........ *G06F 3/165* (2013.01); *H04M 1/72519* (2013.01); *H04W 4/008* (2013.01); *H05B 33/0842* (2013.01); *H05B 37/0272* (2013.01)

(58) Field of Classification Search
CPC .. G06F 3/165; G06F 1/1683; H04M 1/72519; H04W 4/008; H05B 33/0842; H05B 37/0272; H04R 2420/07; H04R 5/04; H04B 5/0006; H04B 5/0031; H04B 5/02

USPC .......... 381/105, 300, 311, 182, 120, 98, 104
See application file for complete search history.

(56) References Cited

U.S. PATENT DOCUMENTS

| | | | |
|---|---|---|---|
| 2014/0064513 A1* | 3/2014 | Behringer ................ | H04R 3/00 381/77 |
| 2016/0023124 A1* | 1/2016 | Wang ..................... | H04R 27/00 381/77 |

* cited by examiner

*Primary Examiner* — Md S Elahee
*Assistant Examiner* — Sabrina Diaz
(74) *Attorney, Agent, or Firm* — Keith L. Jenkins, Registered Patent Attorney, LLC; Keith L. Jenkins (57) ABSTRACT

Streaming audio is adjusted within one or more real-time digital signal processors (DSPs) by entering audio adjustment parameters using a smart phone application on a Bluetooth® enabled smart phone, receiving streaming audio from a Cloud server, and transmitting the adjustment parameters and streaming audio to a Bluetooth® chip in an audio system. The audio adjustment parameters and streaming audio then enter two real-time DSPs where the streaming audio is adjusted according to the audio adjustment parameters and then sent to amplifiers and/or transceivers. The application enables entry of lighting parameters for control of a plurality of RGB LEDS and one or more LED fixtures. The lighting parameters are transmitted to the Bluetooth® chip and adjustments are made, within the Bluetooth® chip, to the lighting control signals based on the lighting parameters, the streaming audio, and by adjusted streaming audio provided by at least one transceiver.

20 Claims, 8 Drawing Sheets

STREAMING AUDIO, DSP, AND LIGHT CONTROLLER SYSTEM

RELATED APPLICATIONS

The present invention claims priority Chinese patent application Serial Number 201510464611.6 filed Aug. 3, 2015 to the same inventors.

FIELD OF ART

The present invention relates to a smart phone application for controlling streaming audio systems by using a blue tooth connection from the smart phone application to a digital signal processor (hereinafter "DSP") and performing adjustment of audio parameters in the DSP based on adjustment parameters generated or received in the smart phone application. The present invention more particularly relates to Bluetooth® to DSP connection in which all the adjustment parameters for modifying the audio, such as equalization, for example, are transmitted from the application on the smart phone to the DSP chip or chips via Bluetooth® and the adjustments are implemented in the DSP chip.

BACKGROUND OF THE INVENTION

Conventional smart phone applications can take an audio source and make adjustments to the audio in the smart phone and then transmit the adjusted audio via WiFi or Bluetooth® to an amplifier and speaker combination, possibly including a DSP, for presentation of the audio. The quality of the adjustments made in the application is less than that of hardwired connection. Adjustments made inside the application are simple fixed effects which cannot reproduce full DSP functionality. There are lots of Wi-Fi DSP products in market, but a Wi-Fi connection has latency issues. The Wi-Fi connection is not stable. The Wi-Fi DSP has to use RAM and other components, which makes the Wi-Fi DSP solution too expensive and oversized. It is possible to use a computer cable for DSP adjustments, but that solution is inconvenient and not portable.

What is needed is a system for performing the audio adjustments inside the DSP, in order to obtain a higher quality sound. The present invention using Bluetooth® DSP is much cheaper, compact, portable, the connection is stable, and it has no latency issue.

SUMMARY OF THE INVENTION

The purpose for this invention is to develop a portable, no latency, stable and convenient audio system to control DSP and LED lighting through a Bluetooth® connection from a mobile device APP, which can be widely used in any audio equipment, such as amplifier, headphone, sound bar, Bluetooth® speakers, etc. This audio system includes: an application in a Bluetooth® enabled mobile device; Bluetooth® audio hardware with auxiliary audio inputs; wireless or wired controller; DSP chips, 2.4 GHz audio transmitter and receiver 2-in-1 chips; built-in or external amplifier; and Cloud servers.

Briefly described, the invention includes two Bluetooth®-connected DSP chips receiving both streaming audio and adjustment parameters from a Bluetooth-transmitting smart phone application and delivering audio output to up to eight channels of full range stereo. Adjustments, such as equalization adjustments, are transmitted to the DSP chips and the adjustments are implemented in the DSP chips for supply to an amplifier and speaker system. Audio sources from outside the smart phone may connected to the DSP chips through an auxiliary input, while the adjustment parameters still originate in the smart phone application. The output of the DSP chips may be hardwired to the amplifier or sent wirelessly on a 2.4 GHz transceiver to a second 2.4 GHz transceiver supplying the amplifier. Multiple channel capability enables the smart phone application to send live voice via the smart phone microphone as a separate channel to be presented with the audio, as is done in karaoke. Some channels can be used for non-audio purposes, such as controlling LED and RGB LED lighting at the same time, changing colors, changing sequence (chase, rainbow, strobe, etc), and also having lights flash to the audio source, at the same time as audio is being played and DSP is being adjusted. The system provides a wired or wireless remote that can be used for play/pause, track forward, track back, volume up and volume down or to adjust color, brightness, sequence or speed on the LED's. DSP equalizer settings can be stored and associated with particular styles of audio so that when that style is played, the settings automatically apply. The current invention using Bluetooth DSP is much cheaper, compact, portable, and the connection is stable and has no latency issue. This streaming audio and light controller can be used as standalone pre-amp hardware; or it can be widely built into amplifiers, Bluetooth® home speakers, portable Bluetooth speaker, headphone, sound bar, professional speakers, and the like.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

As used and defined herein, "smart phone" refers to any Bluetooth® enabled mobile device capable of running software applications, such as, without limitation, smart phones and tablets. As used and defined herein, "Bluetooth®" refers to any short-range wireless communication system meeting the standard of the Bluetooth Special Interest Group. As used and defined herein, "DSP" refers to digital signal processors which processes signal of each channel to adjust digital music signals' attributes, such as volume, equalizer, high frequency & low frequency pass, time delay, fixed effects, frequency, delay, gain, and the like. The DSP chips in the present invention refer to real time DSP chips, which are different from fixed music effect DSP chips.

Figure 1:
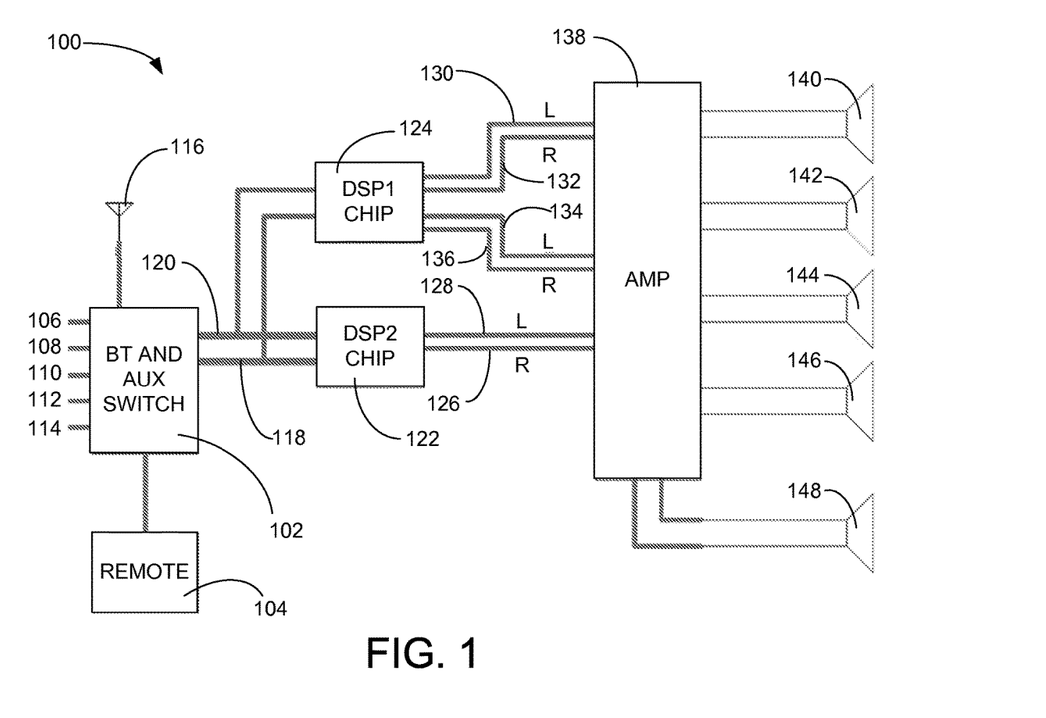
FIG. 1 is a diagrammatic view illustrating an exemplary embodiment of a core of a streaming audio and light controller system, according to a preferred embodiment of the present invention.

FIG. 1 is a diagrammatic view illustrating an exemplary embodiment of a core of a streaming audio and light controller system 100, according to a preferred embodiment of the present invention. Integrated circuit (IC) chip 102 comprises a Bluetooth® receiver and an auxiliary switch for switching to an auxiliary input terminal 114 in preference to input from antenna 116 as a source of streaming audio. Terminal 106 is the +12 VDC terminal, and terminal 112 is the ground terminal. REM IN terminal 108 and REM OUT terminal 110 control amplifier delays after startup. Remote control device 104 can be used to select the position of the auxiliary switch in IC 102. Streaming audio is supplied to two digital signal processor (DSP) chips 122 and 124 over hard wires 118 and 120. Streaming audio includes, without limitation, any one or more of music, voice, and natural or synthetic sounds.

Both audio and control signals are sent to the DSP chips 122 and 124 over audio signal paths 118 and 120, which are preferably hardwired. DSP chips 122 and 124 are preferably four-channel stereo DSP chips 122 and 124. Inside the DSP chips 122 and 124, control signals arriving wirelessly into antenna 116 from a smart phone application 302 (see FIG. 3) or by a wired or wireless connection from remote control 104 are used to adjust the streaming audio signal. The smart phone application 302 may control all the DSP functions of each channel, such as volume, equalizer, high frequency & low frequency pass, time delay, fixed effects, etc. When the smart phone application 302, or similar mobile devices with the application, are not accessible, an RF or wired controller 104 may be used to perform the functions of playing, pause, changing track up or down, turning volume up or down, paring, answering or hanging up a call, and activating a voice command system, such as, without limitation, Siri® or Google®.

Left stereo adjusted audio goes from DSP chip 122 and into amplifier 138 on line 128 and right stereo adjusted audio goes from DSP chip 122 and into amplifier 138 on line 126. Lines 126 and 128 are preferably hardwired. Amplifier 138 is preferably a plurality of amplifier circuits. Front left and right stereo adjusted audio signals are supplied to amplifier 138 over audio signal pathways 130 and 132, (preferably hardwired) respectively. Rear left and right stereo adjusted audio signals are supplied to amplifier 138 over audio signal pathways 134 and 136, (preferably hardwired) respectively. Amplifier 138 supplies amplified adjusted audio to front left stereo speaker 140, front right stereo speaker 142, rear left stereo speaker 144, rear right stereo speaker 146, and mono subwoofer 148. In an additional embodiment, amplifier 138 may also provide a center channel output.

In various embodiments, The DSP processed signal outputs can be stereo (2.0), stereo plus subwoofer (2.1), four-channel stereo (4.0), four-channel stereo plus subwoofer (4.1) or five channel (includes a center channel) plus subwoofer (5.1).

Figure 2:
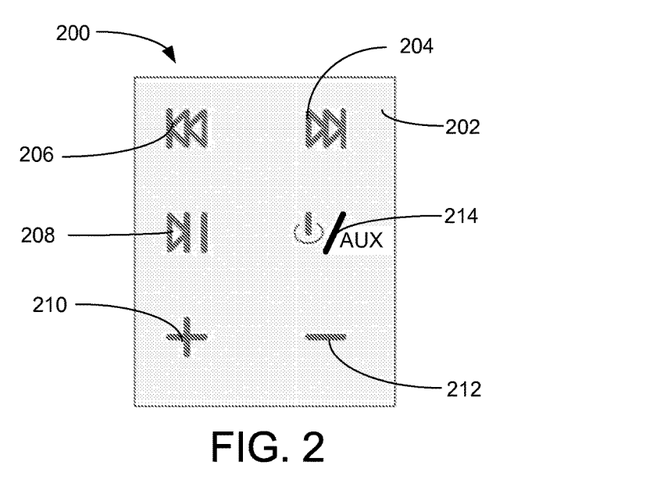
FIG. 2 is a front diagrammatic view illustrating an exemplary embodiment of a remote control touch screen for the streaming audio and light controller system of FIG. 1, according to a preferred embodiment of the present invention.

FIG. 2 is a front diagrammatic view illustrating an exemplary embodiment of a remote control 104 touch screen 200 for the streaming audio and light controller system 100 of FIG. 1, according to a preferred embodiment of the present invention. The remote control 104 touch screen 200 provides a page 202 bearing touch control icons such as track up 204, track down 206, pause/play 208, volume up 210, volume down 212 and a power on/auxiliary switch 214. In various embodiments, there may be multiple pages 202 each having various sets of icons for additional related functions, including controlling LED and RGB LED displays, as will be discussed further below. Remote control 104 may be RF or hardwired.

Figure 3:
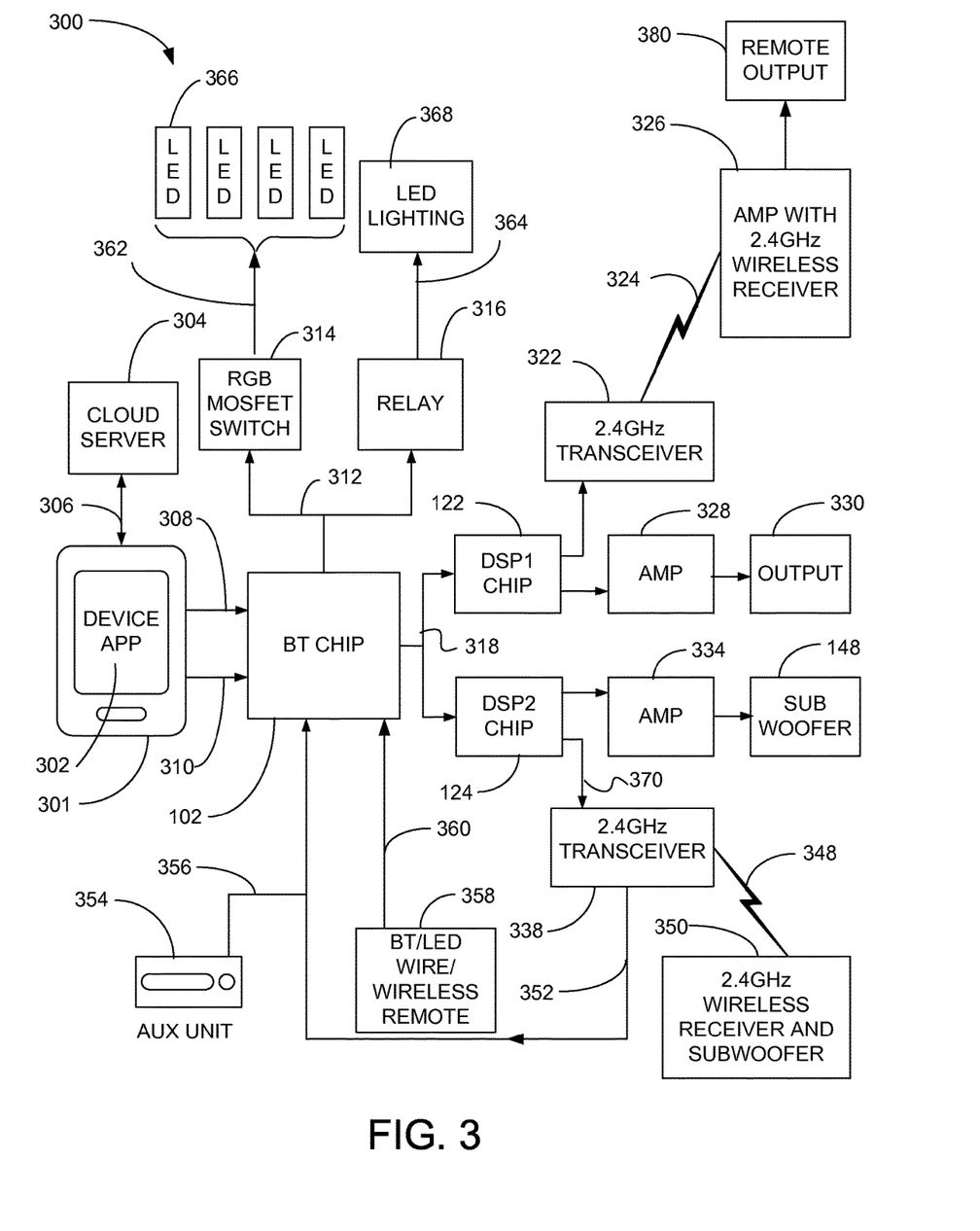
FIG. 3 is a diagrammatic view illustrating an exemplary embodiment of a streaming audio and light controller system, according to a preferred embodiment of the present invention.

FIG. 3 is a diagrammatic view illustrating an exemplary embodiment of a streaming audio and light controller system 300, according to a preferred embodiment of the present invention. Device application 302 accepts user input through application touch screens on a smart phone 301 or similar device. The device application 302 receives streaming audio from a cloud server 304 over wireless link 306, and sends data to the cloud servers 304 over that same link for selecting audio and storing user preferences. Cloud servers 304 also intelligently analyze the user's history and then push and recommend the user's favorite songs. Streaming audio is transferred to the Bluetooth® chip 102 on wireless link 308, while adjustment parameters and lighting control signals are sent wirelessly to the Bluetooth® chip 102 on wireless link 310. Bluetooth® and LED remote control 358 is an expansion of remote control 104 to include lighting controls. Remote control 358 supplies lighting controls to Bluetooth® chip 102 over link 360, which may be wired or wireless. Auxiliary unit 354 is an alternate source of streaming audio supplied to the Bluetooth® chip 102 on link 356, which is preferably wired. Bluetooth® chip 102 may also receive adjusted streaming audio from 2.4 GHz transceiver 338 over (preferably wired) link 352. Adjusted streaming audio is used in Bluetooth® chip 102 to improve the lighting control signals, which would otherwise be dependent only on the un-adjusted streaming audio for forming lighting control signals. Switching between the auxiliary unit 354 and the transceiver 338 is controlled, in the absence of the device application 302, by remote control 358.

Bluetooth® chip 102 produces lighting control signals on line 312 and adjusted audio signals on line 318. For controlling RGB LEDs 366 (one of four labeled), lighting control signals are received at an RGB MOSFET switching circuit 314 and are interpreted to control the color, brightness, and change sequence (chase, rainbow, strobe, and the like) of each RGB LED 366 to enable the RGB LEDs to dance with the audio, especially music. The control voltages 362 are supplied to the four-pin RGB LEDs 366 via hardwired link 362. The lighting control signals are preferably programmable functions of both the adjusted and unadjusted the streaming audio. The number of RGB LEDs 366 is not limited to the number shown in the illustrated embodiment:

other embodiments may have more or fewer RGB LEDs 366. For controlling one or more LED fixtures 368, a lighting control signal drives relay 316 to flash the LED fixtures 368. In a particular embodiment, relay 316 may be an array circuit able to operate a plurality of LED fixtures 368 in coordination with the streaming audio and adjusted streaming audio.

Bluetooth® chip 102 produces streaming audio and control signals to DSP chips 122 and 124 over (preferably hardwired) signal pathway 318. DSP chip 122 supplies adjusted audio signals to amplifier 328 which, in turn drives outputs 330. Outputs 330 may include, for non-limiting examples, one or more of headphones, car audio speakers, marine audio speakers, television speakers, sound bar, portable speakers, home audio speakers, and professional audio speakers. DSP chip 122 also supplies adjusted audio signals to 2.4 GHz transceiver 322 for wireless transmission over link 324 to 2.4 GHz transceiver/amplifier 326. The 2.4 GHz transceiver/amplifier 326 may supply a remote output system 380, such as acoustic drivers, also known as loudspeakers or speakers, with amplified adjusted audio signals.

DSP chip 124 supplies adjusted audio signals to amplifier 334 which, in turn, drives subwoofer 148. DSP chip 124 supplies adjusted audio signals to 2.4 GHz transceiver 338 over (preferably) hardwired link 370 for wireless transmission over link 348 to 2.4 GHz transceiver/subwoofer 350. The 2.4 GHz transceiver 338 also supplies an adjusted streaming audio signal to Bluetooth® chip 102 along signal path 352 for use in adjusting lighting control signals.

In a particular embodiment, 2.4 GHz transceiver/amplifier 326 and 2.4 GHz transceiver/subwoofer 350 may be of one piece. In another particular embodiment, 2.4 GHz transceiver/amplifier 326 and 2.4 GHz transceiver/subwoofer 350 may share a transceiver. In a particular embodiment, amplifier 328 and amplifier 334 may be a single unit, similar to amplifier 138.

Figure 4:
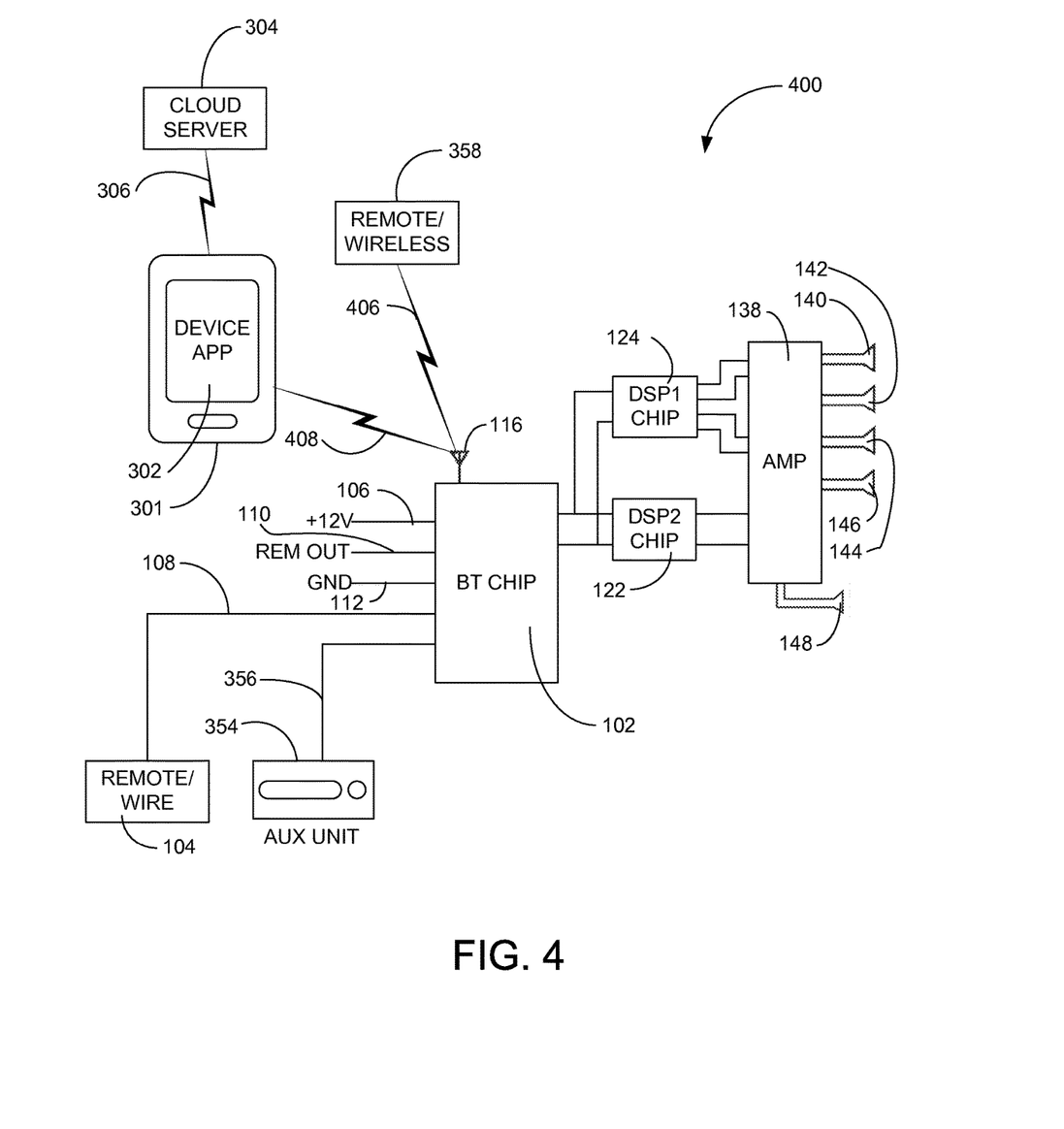
FIG. 4 is a diagrammatic view illustrating an exemplary embodiment of a streaming audio and light controller system, according to a preferred embodiment of the present invention.

FIG. 4 is a diagrammatic view illustrating an exemplary embodiment of a streaming audio and light controller system 400, according to a preferred embodiment of the present invention. Streaming audio and light controller system 400 illustrates how streaming audio and light controller 300 operates in the absence of lighting parameters. Streaming audio and light controller system 400 includes the device application 302 and the cloud server 304, but uses a single multiplexed link 408 to communicate streaming audio and DSP adjustment parameters to the Bluetooth® chip 102. Additionally, both a wired remote 104 and a wireless remote 358 are provided, with the wireless remote 358 communicating over wireless link 406 to Bluetooth® chip 102 via Bluetooth® antenna 116.

Figure 5:
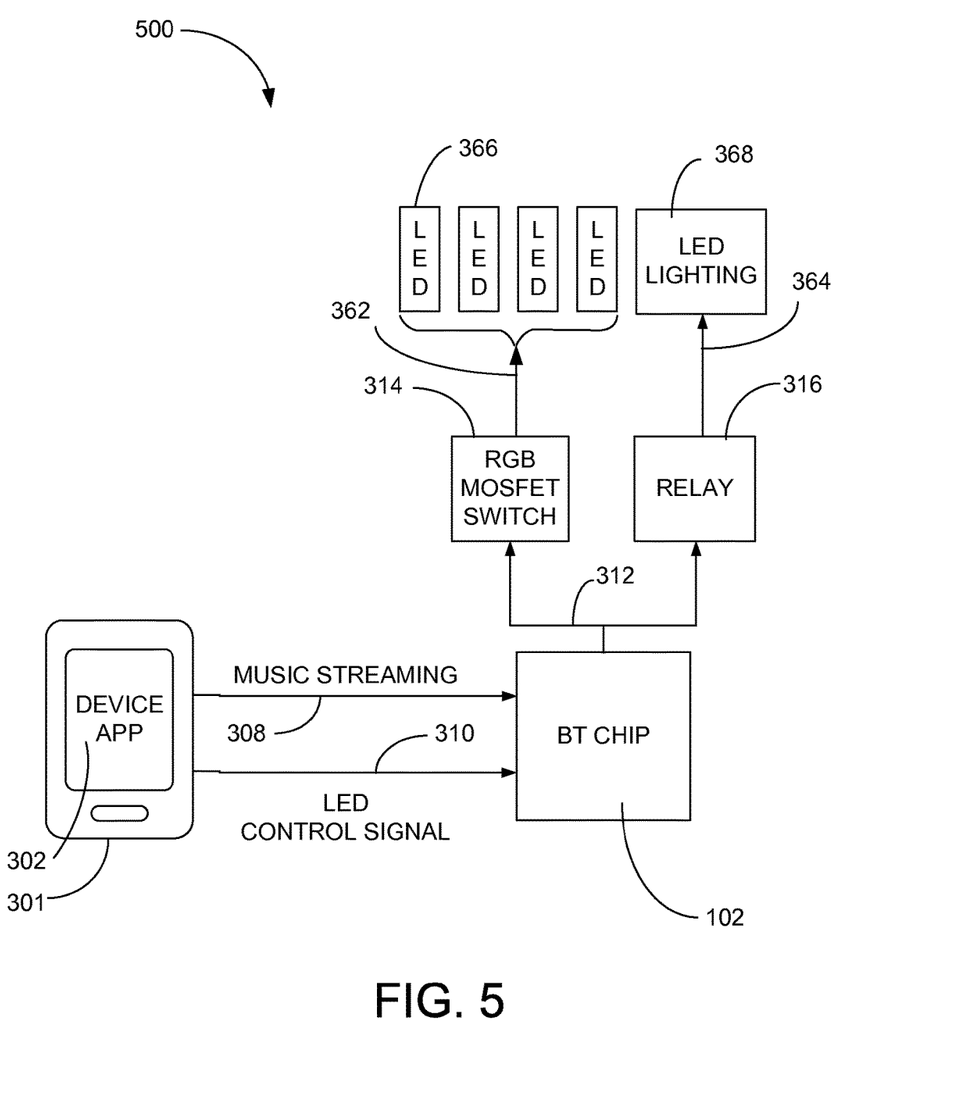
FIG. 5 is a diagrammatic view illustrating an exemplary embodiment of a light controller system, according to a preferred embodiment of the present invention.

FIG. 5 is a diagrammatic view illustrating an exemplary embodiment of a light controller system 500, according to a preferred embodiment of the present invention. Light controller 500 illustrates how streaming audio and light controller system 300 operates when adjusted streaming audio output is not desired. Streaming audio and LED control signal are sent to the Bluetooth® chip 102 from device application 302. The Bluetooth® chip 102 generates the lighting signals as discussed above in regard to FIG. 3. The source of the streaming audio is the smart phone 301 itself.

FIG. 6 through FIG. 9 are merely exemplary. Those of skill in the art, enlightened by the present disclosure, will be aware of a wide variety of ways in which DSP audio adjustment parameters may be input into a smart phone, all of which are within the scope of the present invention.

Figure 6:
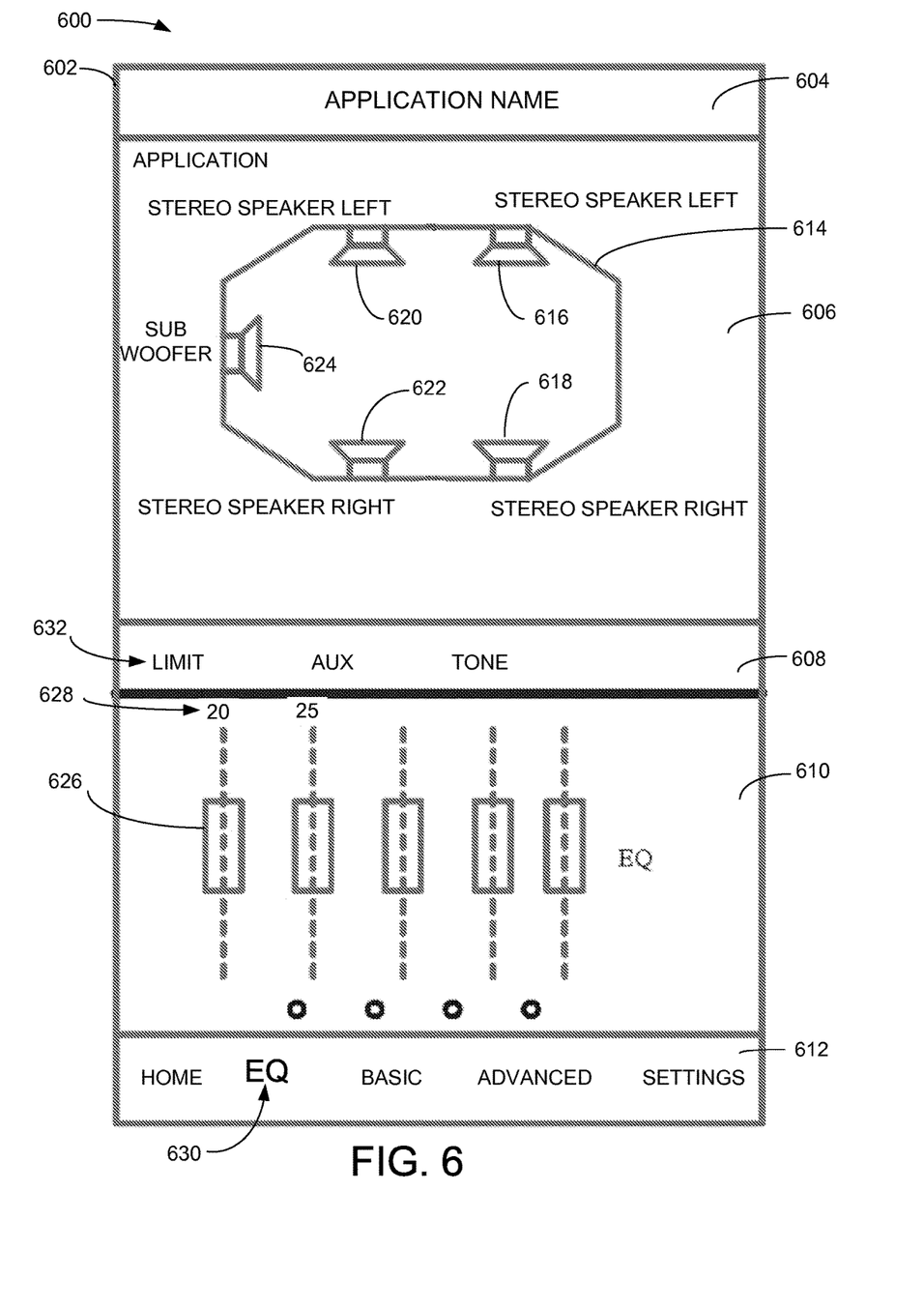
FIG. 6 is a front elevation view of an exemplary embodiment of a first screen of a user interface for use with the streaming audio and light controller system of FIG. 1 and FIG. 4, according to a preferred embodiment of the present invention.

FIG. 6 is a front elevation view of an exemplary embodiment of a first screen 600 of a user interface for use with the streaming audio and light controller systems 100 and 400 of FIG. 1 and FIG. 4, respectively, according to a preferred embodiment of the present invention. The user interface is a portion of the smart phone application 302 on the smart phone 301 or similar device and displays on the conventional smart phone 301 front display panel. Page 602 includes five windows, including an application name window 604, speaker diagram window 606, middle menu 608, main window 610, and main menu 612. The speaker diagram 614 is adaptive to the actual audio system to which the user interface is coupled. In an embodiment, speaker icons 616, 618, 620, 622, and 624 may correspond to speakers front left stereo speaker 140, front right stereo speaker 142, rear left stereo speaker 144, rear right stereo speaker 146, and mono subwoofer 148, respectively. In a particular embodiment, touching a speaker icon 616, 618, 620, 622, or 624 may bring up an information window and/or a menu regarding the particular speaker corresponding to that icon. Middle menu 608 includes pull down menus 632 (one of three labeled), one or more of which may be specific to a particular speaker icon 616, 618, 620, 622, or 624. Main window 610 illustrates an equalizer display with slider bars 626 (one of five labeled) on scales 628 (one of five labeled) for varying the power in each of five frequency bands corresponding to the scales 628. Other, fewer, or more frequency bands may be provided in the equalizer in various additional embodiments. Data produced by this application may be converted to DSP adjustment parameters and sent to the DSP chips 122 and 124 via Bluetooth® chip 102. The main menu 612 controls main window 610 and shows that the equalizer (EQ) application has been selected 630, as shown by the increased font size. Other, fewer, or more main menu 612 selection icons 630 may be used in various additional embodiments. In a particular embodiment, additional pages may include lighting parameter controls for programming the responses of the lights 366 and 368 to the streaming audio, adjusted streaming audio, or responses independent of the audio.

Figure 7:
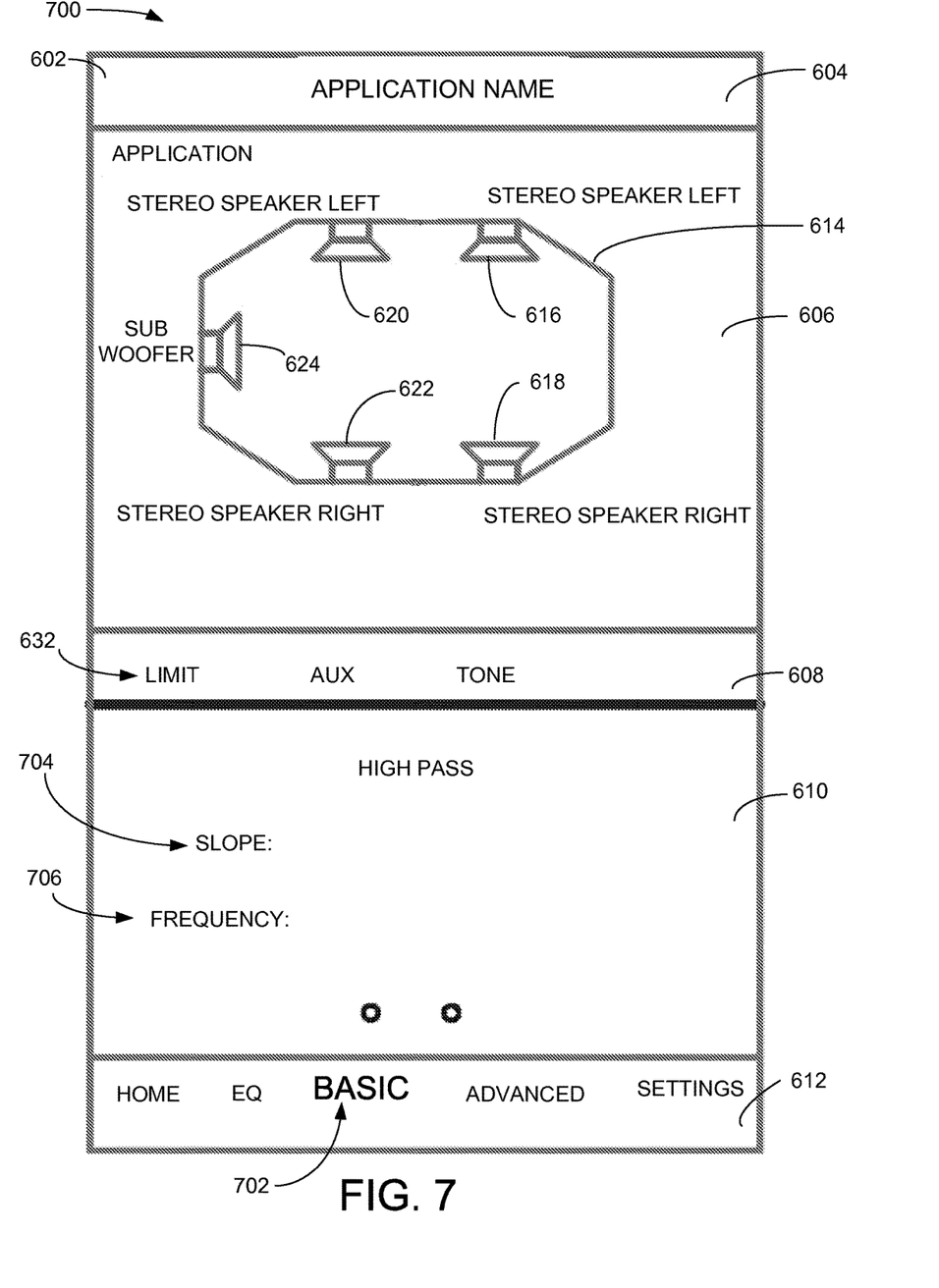
FIG. 7 is a front elevation view of an exemplary embodiment of a second screen of a user interface for use with the streaming audio and light controller system of FIG. 1 and FIG. 4, according to a preferred embodiment of the present invention.

FIG. 7 is a front elevation view of an exemplary embodiment of a second screen 700 of a user interface for use with the streaming audio and light controller systems 100 and 400 of FIG. 1 and FIG. 4, respectively, according to a preferred embodiment of the present invention. The basic main menu icon 702 has been selected, showing parameters for a high pass filter including slope 704 and frequency 706. Data produced by this application may be converted to DSP adjustment parameters and sent to the DSP chips 122 and 124 via Bluetooth® chip 102. In various additional embodiments, other, fewer, or more filter parameters 704 and 706 may be provided. In a particular embodiment, a low pass filter may also be provided.

Figure 8:
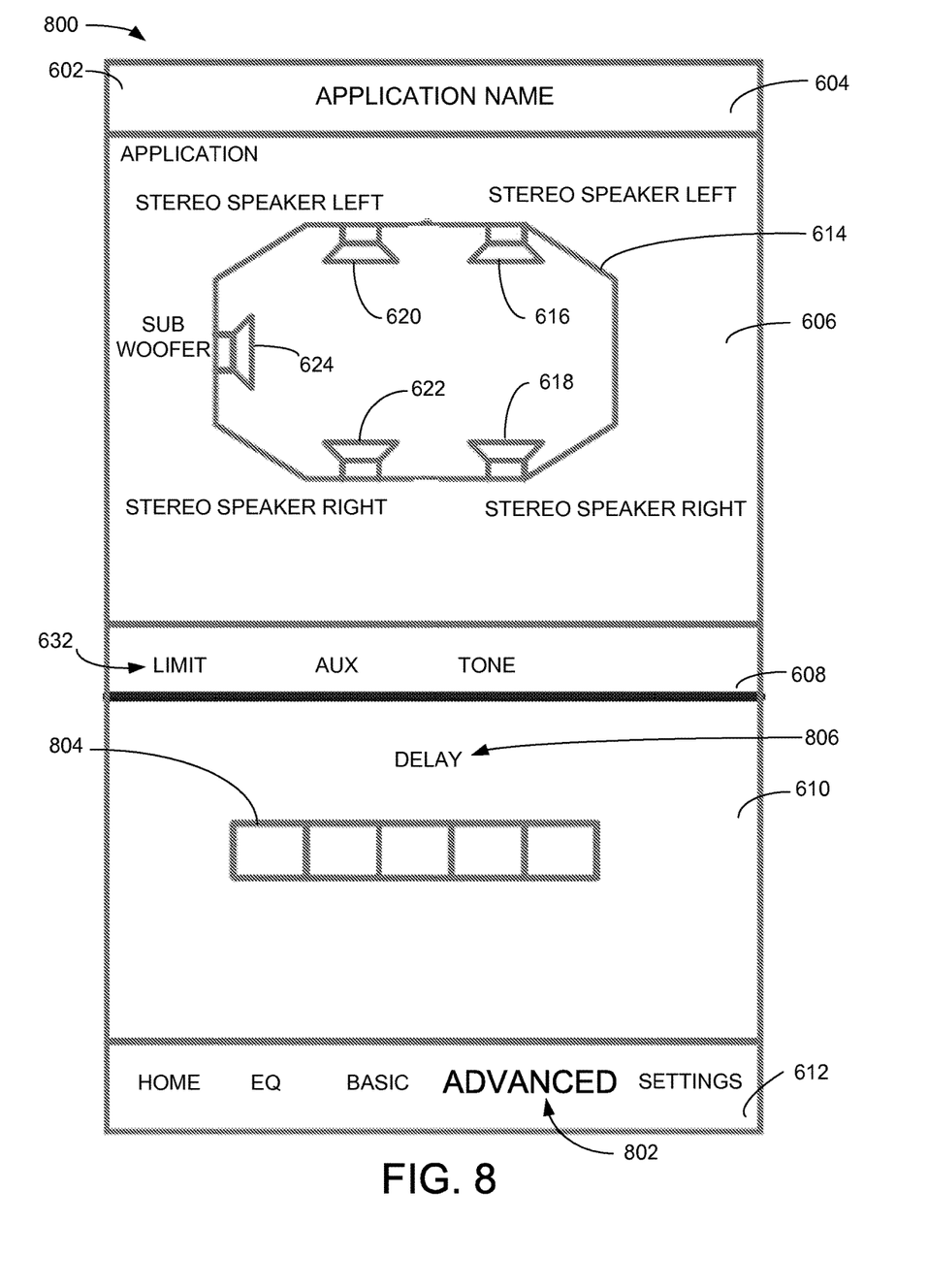
FIG. 8 is a front elevation view of an exemplary embodiment of a third screen of a user interface for use with the streaming audio and light controller system of FIG. 1 and FIG. 4, according to a preferred embodiment of the present invention.

FIG. 8 is a front elevation view of an exemplary embodiment of a third screen of a user interface for use with the streaming audio and light controller systems 100 and 400 of FIG. 1 and FIG. 4, respectively, according to a preferred embodiment of the present invention. The advanced main menu icon 802 has been selected, showing a delay adjustment window 806 with a selector bar 804 which can be filled to the desired delay level by a finger swipe from the left end. Data produced by this application may be converted to DSP adjustment parameters and sent to the DSP chips 122 and 124 via Bluetooth® chip 102. In various additional embodiments, other, fewer, or more delay icons 804 may be displayed.

Figure 9:
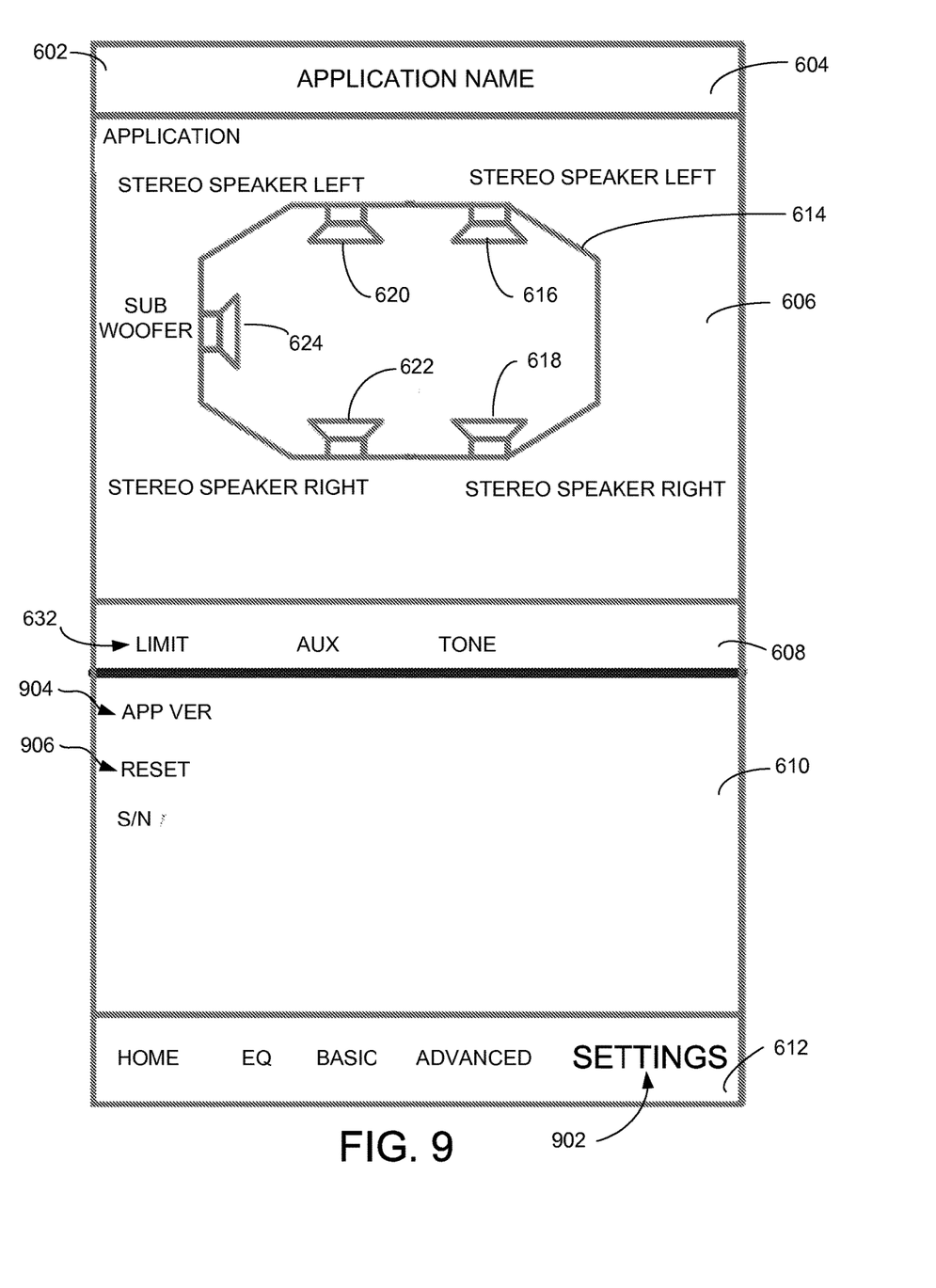
FIG. 9 is a front elevation view of an exemplary embodiment of a fourth screen of a user interface for use with the streaming audio and light controller system of FIG. 1 and FIG. 4, according to a preferred embodiment of the present invention.

FIG. 9 is a front elevation view of an exemplary embodiment of a fourth screen of a user interface for use with the streaming audio and light controller systems 100 and 400 of FIG. 1 and FIG. 4, respectively, according to a preferred embodiment of the present invention. The settings main menu icon 902 has been selected, showing reference data 904 (one of two labeled) and a rest icon 906 which, if touched, returns all adjustment settings to default values.

The embodiments illustrated and discussed above are exemplary, within the functional and mechanical constraints of the present invention, as delineated in the claims below in light of the disclosure above, a wide scope of variations exist. For non-limiting example, speaker diagram 614 may, in a particular embodiment, have a center channel speaker added. For another non-limiting example, various switching circuits may be substituted for the lighting drivers, such as RGB MOSFET switching circuit 314 and relay circuit 316. Those of skill in the art, illuminated by the present disclosure, will be aware of the many other variations that can be made within the scope of the present invention.

We claim:

1. A streaming audio and light controller system comprising:
   a. a smart phone device hosting an application further comprising:
      i. a user interface adapted to input audio adjustment parameters;
      ii. a receiver adapted to receive streaming audio signals; and
      iii. a Bluetooth® transmitter adapted to:
         1. wirelessly connect to a Bluetooth® integrated circuit outside said smart phone device; and
         2. transfer said audio adjustment parameters and said streaming audio signals to said Bluetooth® integrated circuit; and
   b. two real-time digital signal processors in communication with said Bluetooth® integrated circuit, wherein said two real-time digital signal processors are each adapted to:
      i. receive said streaming audio signals and said audio adjustment parameters from said Bluetooth® integrated circuit; and
      ii. adjust said streaming audio signals according to said audio adjustment parameters;
      iii. receive auxiliary streaming audio signals and auxiliary audio adjustment parameters from said Bluetooth® integrated circuit that are provided to said Bluetooth® integrated circuit via a hard-wired auxiliary streaming audio signal source in direct communication with said Bluetooth® integrated circuit.

2. The streaming audio and light controller system of claim 1, comprising at least one amplifier adapted to receive and amplify said adjusted streaming audio signals.

3. The streaming audio and light controller system of claim 2, comprising at least one acoustic driver adapted to:
   a. receive said amplified adjusted streaming audio signals; and
   b. convert said amplified adjusted streaming audio signals into sound.

4. The streaming audio and light controller of claim 3, wherein said at least one acoustic driver comprises at least one of at least one subwoofer and at least one midrange loudspeaker.

5. The streaming audio and light controller of claim 1, comprising at least one 2.4 GHz transceiver adapted to:
   a. receive said amplified adjusted streaming audio signals; and
   b. wirelessly transmit said adjusted streaming audio signals to at least one 2.4 GHz wireless receiver;
      i. wherein said at least one 2.4 GHz wireless receiver comprises at least one remote amplifier; and
      ii. wherein said at least one remote amplifier is adapted to communicate with at least one remote acoustic driver.

6. The streaming audio and light controller of claim 5, wherein said at least one remote acoustic driver comprises at least one of at least one subwoofer and at least one midrange loudspeaker.

7. The streaming audio and light controller system of claim 1, wherein said receiver adapted to receive streaming audio signals is adapted to receive said streaming audio signals from at least one Cloud server.

8. The streaming audio and light controller system of claim 1, wherein said Bluetooth® integrated circuit is adapted to receive streaming audio signals from said smart phone device hosting an application and from said auxiliary source of streaming audio signals.

9. The streaming audio and light controller system of claim 1, wherein said Bluetooth® integrated circuit is adapted to communicate with a hardwired remote control and with a wireless remote control.

10. The streaming audio and light controller system of claim 1, further comprising:
    a. said user interface further adapted to input lighting control parameters; and
    b. said Bluetooth® transmitter further adapted to transfer said lighting control parameters to said Bluetooth® integrated circuit.

11. The streaming audio and light controller system of claim 10, comprising a light control output of said Bluetooth® integrated circuit adapted to control at least one of a plurality of RGB LEDs and at least one LED lighting fixture.

12. The streaming audio and light controller system of claim 11, wherein said light control output comprises a function of at least one of said streaming audio signals and said adjusted streaming audio signals.

13. A streaming audio and light controller system comprising:
    a. a smart phone device hosting an application further comprising:
       i. a user interface adapted to input:
          1. audio adjustment parameters; and
          2. lighting control parameters
       ii. a receiver adapted to receive streaming audio signals; and
       iii. a Bluetooth® transmitter adapted to:
          1. wirelessly connect to a Bluetooth® integrated circuit outside said smart phone device; and
          2. transfer said audio adjustment parameters, said streaming audio signals, and said lighting control parameters to said Bluetooth® integrated circuit;
    b. two real-time digital signal processors in communication with said Bluetooth® integrated circuit, wherein said two real-time digital signal processors are each adapted to:
       i. receive said streaming audio signals and said audio adjustment parameters from said Bluetooth® integrated circuit; and
       ii. adjust said streaming audio signals according to said audio adjustment parameters; and
       iii. receive auxiliary streaming audio signals and auxiliary audio adjustment parameters from said Bluetooth® integrated circuit that are provided to said Bluetooth® integrated circuit via a hard-wired auxiliary streaming audio signal source in direct communication with said Bluetooth® integrated circuit;
c. at least one amplifier adapted to receive and amplify said adjusted streaming audio signals;
d. at least one lighting driver in communication with said Bluetooth® integrated circuit, wherein said at least one lighting driver is adapted to:
i. receive lighting control signals that have been adjusted within said Bluetooth® integrated circuit as a function of at least one of said streaming audio signals and said adjusted streaming audio signals; and
ii. drive at least one lighting device responsive to said adjusting lighting control signals.

14. The streaming audio and light controller system of claim 13, comprising at least one acoustic driver adapted to:
a. receive said amplified adjusted streaming audio signals; and
b. convert said amplified adjusted streaming audio signals into sound.

15. The streaming audio and light controller of claim 13, comprising at least one 2.4 GHz transceiver adapted to:
a. receive said amplified adjusted streaming audio signals; and
b. wirelessly transmit said adjusted streaming audio signals to at least one 2.4GHz wireless receiver;
i. wherein said at least one 2.4 GHz wireless receiver comprises at least one remote amplifier; and
ii. wherein said at least one remote amplifier is adapted to communicate with at least one remote acoustic driver.

16. The streaming audio and light controller system of claim 13, wherein said Bluetooth® integrated circuit is adapted to receive streaming audio signals from said smart phone device hosting said application and from said auxiliary source of streaming audio signals.

17. The streaming audio and light controller system of claim 13, wherein said Bluetooth® integrated circuit is adapted to communicate with a hardwired remote control and with a wireless remote control.

18. A streaming audio and light controller system comprising:
a. a smart phone device hosting an application further comprising:
i. a user interface adapted to input:
1. audio adjustment parameters; and
2. lighting control parameters
ii. a receiver adapted to receive streaming audio signals; and
iii. a Bluetooth® transmitter adapted to:
1. wirelessly connect to a Bluetooth® integrated circuit outside said smart phone device; and
2. transfer said audio adjustment parameters, said streaming audio signals, and said lighting control parameters to said Bluetooth® integrated circuit;
b. two real-time digital signal processors in communication with said Bluetooth® integrated circuit, wherein said two real-time digital signal processors are each adapted to:
i. receive said streaming audio signals and said audio adjustment parameters from said Bluetooth® integrated circuit;
ii. adjust said streaming audio signals according to said audio adjustment parameters; and
iii. receive auxiliary streaming audio signals and auxiliary audio adjustment parameters from said Bluetooth® integrated circuit that are provided to said Bluetooth® integrated circuit via a hard-wired auxiliary streaming audio signal source in direct communication with said Bluetooth® integrated circuit;
c. at least one amplifier adapted to receive and amplify said adjusted streaming audio signals;
d. at least two acoustic drivers adapted to:
i. receive said amplified adjusted streaming audio signals from said two real-time digital signal processors; and
ii. convert said amplified adjusted streaming audio signals into sound;
e. at least one 2.4 GHz transceiver adapted to:
i. receive said amplified adjusted streaming audio signals from said two real-time digital signal processors; and
ii. wirelessly transmit said adjusted streaming audio signals to at least one 2. 4 GHz wireless receiver;
1. wherein said at least one 2.4 GHz wireless receiver comprises at least one remote amplifier; and
iii. wherein said at least one remote amplifier is adapted to communicate with at least one remote acoustic driver; and
f. at least one lighting driver in communication with said Bluetooth® integrated circuit, wherein said at least one lighting driver is adapted to:
i. receive lighting control signals that have been adjusted within said Bluetooth® integrated circuit as a function of at least one of said streaming audio signals and said adjusted streaming audio signals; and
ii. drive at least one lighting device responsive to said adjusted lighting control signals.

19. The streaming audio and light controller system of claim 18, wherein said at least one 2.4 GHz transceiver supplies adjusted streaming audio signals to said Bluetooth® integrated circuit.

20. The streaming audio and light controller system of claim 18, wherein said Bluetooth® integrated circuit:
a. is adapted to receive streaming audio signals from said smart phone device hosting said application and from said auxiliary source of streaming audio signals; and
b. is adapted to communicate with a hardwired remote control and with a wireless remote control.

* * * * *